US005626705A

United States Patent [19]
Winterowd et al.

[11] Patent Number: 5,626,705
[45] Date of Patent: May 6, 1997

[54] RAPID SETTING ADHESIVE AND METHOD OF ITS USE

[75] Inventors: Jack G. Winterowd, Puyallup; Harvey H. Cox, Seattle; Roland E. Kreibich, Auburn; Stanley L. Floyd, Enumclaw; Hans Gross, Auburn, all of Wash.

[73] Assignee: Weyerhaeuser Company, Federal Way, Wash.

[21] Appl. No.: 482,512

[22] Filed: Jun. 7, 1995

[51] Int. Cl.$^6$ ..................... B29C 65/00
[52] U.S. Cl. ............ 156/304.5; 156/310; 156/335; 428/58; 428/525; 428/529; 525/501; 525/504
[58] Field of Search ............... 156/304.5, 310, 156/335; 144/347, 352; 428/525, 529, 58; 525/501, 504; 528/146

[56] References Cited

U.S. PATENT DOCUMENTS

| | | |
|---|---|---|
| Re. 26,881 | 5/1970 | Kreibich et al. |
| 2,385,372 | 9/1945 | Rhodes . |
| 2,414,414 | 1/1947 | Rhodes . |
| 2,495,175 | 1/1950 | Nagel . |
| 2,557,826 | 6/1951 | Keaton et al. |
| 3,492,263 | 1/1970 | Kreibich et al. |
| 3,784,514 | 1/1974 | Tiedeman ..................... 525/504 |
| 3,784,515 | 1/1974 | Freeman et al. |
| 3,786,025 | 1/1974 | Freeman et al. |
| 3,802,986 | 4/1974 | Forsythe ..................... 156/304.5 |
| 4,061,620 | 12/1977 | Gillern ..................... 428/528 |
| 4,146,513 | 3/1979 | Weaver et al. ..................... 525/504 |

FOREIGN PATENT DOCUMENTS

| | | |
|---|---|---|
| 493010 | 7/1992 | European Pat. Off. . |
| 61-58484 | 4/1986 | Japan . |

OTHER PUBLICATIONS

Chemical Abstracts 91:88 (1979), Abstract No. 159311c.

*Primary Examiner*—John J. Gallagher

[57] ABSTRACT

A rapid curing adhesive for wood finger jointing and laminating and a method of its use are disclosed. The adhesive consists of two parts that are used as a honeymoon system. One part is used on one side of the joint being formed and the other part on the other side. When the parts are joined under pressure a very rapid reaction occurs resulting in a durable weather resistant joint. Wood finger joints bonded with the adhesive can be handled for further processing within as little time as 15 seconds. The first part of the adhesive is a conventional resorcinol-formaldehyde or phenol-resorcinol formaldehyde resin containing a hardener such as an alkylene group donor. The second part is a similar resin lacking any hardener but containing a modifier which is a heterocyclic oxygen and nitrogen containing compound. Morpholine has proved to serve well as the modifier. The hardener in the first part is used in a sufficient amount to effect a thermosetting cure for the resin used in both parts. Despite the rapid reaction when the two parts are combined, the adhesive has a significant closed assembly time tolerance before application of full pressure to the joint.

21 Claims, 2 Drawing Sheets

RAPID SETTING ADHESIVE AND METHOD OF ITS USE he present invention is a durable rapid curing thermosetting adhesive composition and the method of its use. It is especially well adapted to joining wood products wherein the wood is of high moisture content and/or where very rapid cure times are desirable.

BACKGROUND OF THE INVENTION

Thermosetting adhesives have been used for many years where durable weather resistant bonds are required. Most of these are based on phenol-formaldehyde condensation products or phenol-formaldehyde polymers further modified by addition of a dihydric aromatic compound such as resorcinol. Occasionally resorcinol-formaldehyde polymers have been used as adhesives but these are less common because of their high cost. The phenol-resorcinol-formaldehyde, or PRF, adhesives have the advantage that they cure to infusible and insoluble thermoset polymers at room temperatures. Other adhesives that will cure very rapidly at room temperature, such as those based on condensation products of formaldehyde and phenol with aromatic amine compounds; e.g. m-aminophenol, diaminonaphthalenes or hydroxyaminonaphthalenes, and conjugated nitrogen containing heterocycles such as pyrroles or diaminopyridines have not found commercial acceptance for a number of reasons. These include high cost and toxicity of some ingredients. Adhesives which are exemplary of these rapid curing types are described in U.S. Pat. Nos. 3,784,515, 3,786,025, and 3,784,514 respectively. These resins are mixed with a hardener at the time of use. Hardeners contain alkylene group donors and most typically include formalin, paraformaldehyde, or α-polyoxymethylene mixed with an inert filler in a powdered solid system or liquid suspension.

The method of making phenol-resorcinol-formaldehyde adhesive compositions is well known in the art. Typically, a phenol-formaldehyde resole is first formed. This may be condensed in the presence of an alkaline catalyst such as sodium hydroxide or sodium carbonate or with an ortho-directing catalyst such as calcium or zinc acetate. At some point after the initial condensation, resorcinol is added in an amount so that the ultimate ratio of formaldehyde to aromatic hydroxy compounds is less than unity, typically about 0.65 to 0.75. U.S. Pat. Nos. 2,385,372, 2,414,414, and 4,061,620 are typical of processes making the alkaline condensed resins while U.S. Pat. No. 3,492,263 is directed to ortho-condensed phenol-resorcinol adhesive resins.

Phenol-resorcinol-formaldehyde adhesives are readily available from several commercial sources. The commercial products are sold in a number of grades for different applications; e.g., finger jointing and laminating. All of these are basically similar although they may have minor differences in such properties as water dilutability, viscosity, resorcinol to phenol ratio, pot life after hardener addition, compatibility with solid or liquid hardener systems, etc. While there are PRF resins that are preferred for use with the present invention, many if not most of those presently on the market would be acceptable. PRF adhesive resins per se form no part of the present invention.

Environmental concerns affecting both public and private forest lands, and poor stewardship on many forest lands over the past century, have greatly reduced the available supply of timber for the manufacture of lumber and other forest products. In many cases it is now necessary to use lumber formed from smaller pieces glued together using finger or scarf joints and/or edge gluing simply because the large logs necessary to cut it in solid sawn form are not available. Unfortunately, gluing technology has not evolved at the same rate as the need for utilization of small and low grade logs.

One particular problem facing wood products manufacturers has been bonding of "wet" woods; i.e., those above about 12–16% moisture content. There are many ways in which the ability to bond these higher moisture content woods would be beneficial to forest products producers. Until a short time ago there was no fully reliable way to bond high moisture content woods. Recently one successful process suitable for bonding wetter wood has become available. This is described in European Patent Application 493,010. In this process a PRF resin with added hardener is allowed to advance somewhat to a rather high viscosity before it is placed on one of the members to be joined. A cure promoter chemical, selected from groups such as ammonia or amine derivatives, low molecular weight carboxylic acids, or Lewis acids, is placed on the opposite surface to be mated. Aqua ammonia of about 28–30% concentration appears to be a preferred cure promoter. The members are then clamped with sufficient pressure to cause mixing of the cure promoter and resin. Within several minutes the resulting joint has developed sufficient strength to be handled. Further cure until the ultimate joint strength is developed takes place over a matter of hours.

While the particular adhesive system just noted is new, these so called "honeymoon" systems, in which reactive components are placed separately on opposite sides of a joint, have been known for many years. The first disclosure to the present inventors knowledge in which a PRF honeymoon resin formulation was used is found in U.S. Pat. No. 2,557,826. U.S. Pat. No. 3,802,986 describes a PRF honeymoon system specifically adapted for finger jointing short pieces of lumber. In some honeymoon systems, such as the one noted in the above European patent application, the resin is placed on one side of the joint and the hardener or accelerator of some sort on the other. In others, both components are adhesives in their own right and will cure to form bonds even if mixing is poor when the two sides are brought together. For many reasons, some valid and others not, honeymoon adhesives have never found wide acceptance. Despite certain problems such as emission of dangerous ammonia fumes, the ability of the process in the above noted European patent application to glue high moisture content woods may help to overcome this past reluctance to use honeymoon systems.

The present invention represents an improvement in the art in that it has the ability to form strong bonds in woods having moisture contents of up to 200% while producing excellent durability wet or dry. The adhesive and method have the further very significant advantages of providing extremely short cure times when joints are placed under pressure while allowing substantially prolonged assembly times prior to application of full pressure.

SUMMARY OF THE INVENTION

The present invention is directed to a durable adhesive composition that is highly effective in bonding woods over an extremely wide range of moisture contents and to the method of its use. The adhesive can be formulated to develop sufficient strength for handling two or more members being bonded, usually in times significantly less than one minute at room or slightly elevated temperatures. In addition it permits laminates to be formed with a closed assembly time of at least about 30 minutes before application of full pressure. The adhesive consists of two components or parts. The first is a conventional phenol-resorcinol-formaldehyde resin, such as a wood laminating adhesive, along with a hardener containing an alkylene group donor such as formaldehyde, paraformaldehyde, or α-polyoxymethylene. The second part is a similar or identical resin which does not use a conventional hardener but instead contains a modifier which is a heterocyclic nitrogen and oxygen containing compound of the formula

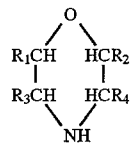

wherein any of $R_1$ to $R_4$ are hydrogen or $C_1$ or $C_2$ alkyl. The preferred modifier is morpholine in an amount of from 1–20 parts per 100 parts of resin by weight, preferably 4–6 parts per 100 parts of resin in the second part of the composition.

A sufficient amount of the alkylene donor hardener is contained in the first part of the composition to effect a full thermosetting cure of both parts when they are ultimately combined. The nature of the curing reaction is not well understood. However, the morpholine appears to acts as a trigger to promote a very rapid reaction when the two parts are mixed together.

The above adhesives are ideal for honeymoon application; i.e., the first adhesive part is spread on the appropriate surface of one of the members to be joined and the second adhesive part is similarly spread on a corresponding surface of the second member. These are then brought together under pressure to form the ultimate glue-bonded joint.

The joints may be brought together under pressure low enough so that significant mixing does not occur. The reaction between the two adhesive parts is delayed allowing closed assembly times as long as about 30 minutes. This assembly time tolerance has been lacking in any of the previously known honeymoon systems and is particularly necessary when a number of members are being laminated simultaneously.

The adhesive system is effective over ranges of moisture from oven dry to about 200%. Where reference is made to "wet" wood it means any that is above the 12–16% moisture range which is usually the maximum tolerated by conventional PRF adhesive systems. Wet wood can encompass that between the 12%–16% and the fiber saturation point which is usually about 28%–30%, and it can include wood with moisture contents above the fiber saturation point up to about 200 % moisture content. These very high moisture content woods are also often referred to as "green" wood, a term that implies that there has been little or no drying from the moisture content at the time when the trees were harvested.

The ability to glue wet woods affords many advantages, a number of which are well set out in the aforenoted European Patent Application 493,010. Among these are the ability to join smaller pieces of clear wet wood prior to drying so that valuable kiln space and energy are not wasted drying defects. Further, where green wood use is permitted in construction, the quality can be improved by removing defects. An example would be the upgrading of lower quality woods for use as green studs in residential and commercial construction.

A further application would be the end joining of short clear sections of green logs for lumber or veneer manufacture or of short plywood peeler cores for sawing into lumber or for other uses such as posts. These shapes are collectively referred to as "roundwood".

It is an object of the present invention to provide a thermosetting adhesive composition that will give durable and permanent bonds on wood ranging in moisture content from oven dry to about 200% moisture content.

It is another object to provide an adhesive of the above type that will cure in extremely short times at room or slightly elevated temperatures It is a further object to provide an adhesive of the above type that will allow significant open and closed assembly times.

It is yet an object to provide a method by which two members can be bonded using an adhesive of the type described in which one component is spread on one member and the other component on the other member then pressing the members together to cause the bond to occur.

These and many other objects will become readily apparent upon reading the following detailed description.

DETAILED DESCRIPTION OF THE PREFERRED EMBODIMENTS

For the following experiments an adhesive composition was formed in the following manner. The first part, designated part "A", comprised of 100 parts by weight of an adhesive commercially available as Cascophen® LT-75 room temperature setting phenol-resorcinol glue, 10 parts of Cascoset® FM 260 dry powdered hardener, and 20 parts of 91% paraformaldehyde. LT-75 is a warm/hot water washable adhesive with relatively low water dilutability and is designated as a wood laminating adhesive. It is available from Borden, Inc., Bellevue, Wash. Cascoset® FM 260 hardener is available from the same supplier and is believed to be composed of about equal parts of paraformaldehyde and a filler such as wood or walnut shell flour, with a small amount of fumed silica included for viscosity control. Cascophen and Cascoset are registered trademarks of Borden, Inc. The mixed first part is a complete wood adhesive in its own right with a typical pot life of up to 1 hour at 18°–20° C.

The second part of the adhesive, designated part B, was composed of 100 parts of Borden Cascophen® LT-5235 PRF resin and 6 parts of morpholine. LT-5235 is also a wood laminating adhesive with somewhat greater water tolerance than LT-75. This is designed for use with a liquid slurry hardener although no hardener was used in the present instance. Pot life of this mixture is in excess of one month. Inclusion of any methylene group donor-type hardener in the second part of the adhesive is not normally desirable at this time.

Up to 10 parts of an inert volatile diluant such as isopropyl alcohol may be added to either part for viscosity reduction if necessary.

The use of the Borden resins and hardener is not intended as an endorsement of these particular products. Equally satisfactory PRF adhesive products are available from other suppliers as well.

It should be noted that Part A of the adhesive contains significantly more hardener than is needed or usually recommended for this resin. Part A should contain sufficient hardener to effect ultimate cure of the resin in both parts A and B.

EXAMPLE 1

Figure 1:
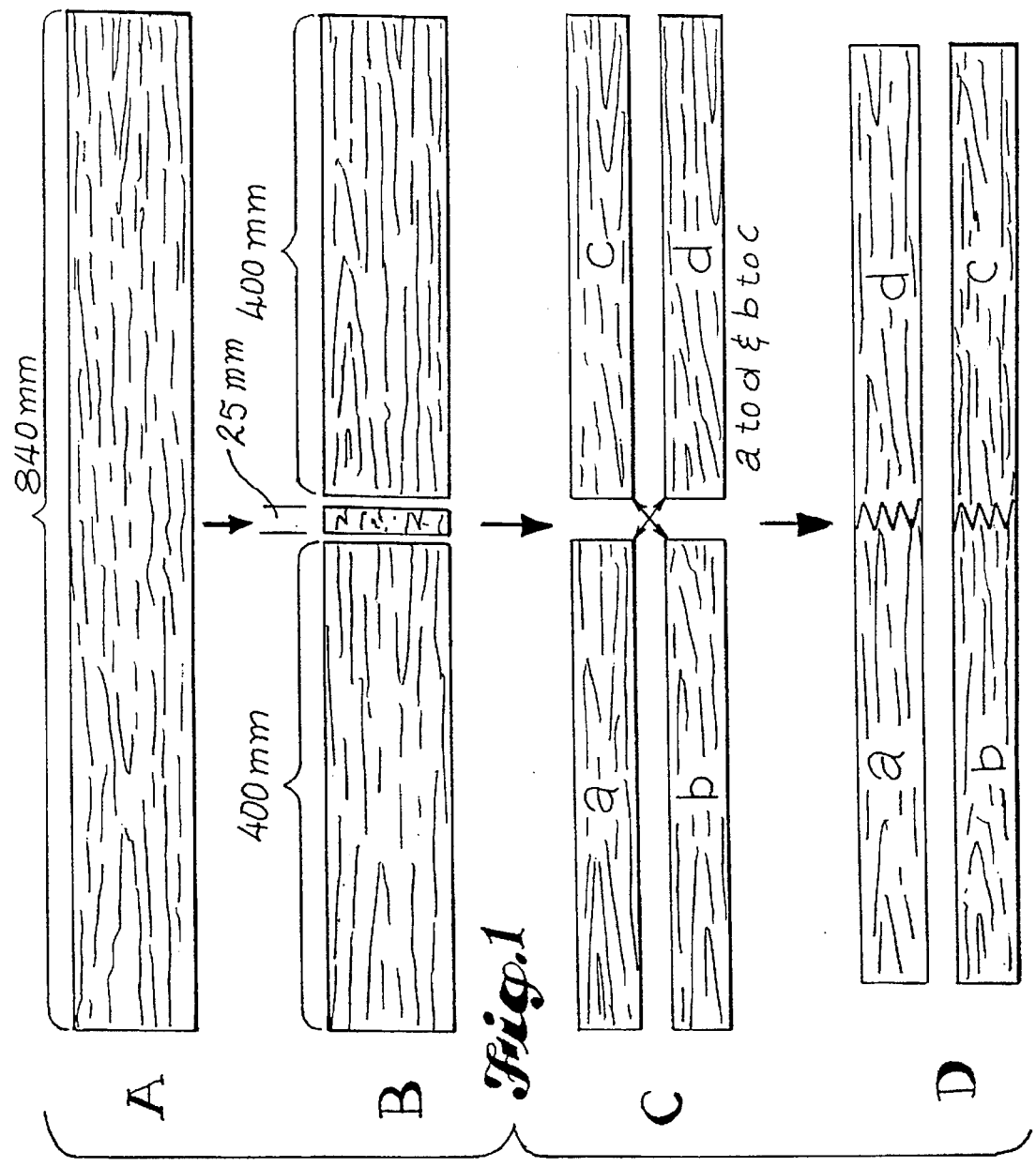
FIG. 1 is a diagram showing the cutting and joining pattern of finger jointed test samples.

Green Douglas-fir lumber of nominal 2"×4" (51×102 mm) cross section was cut into pieces 840 mm long. These were divided into two equal portions. One portion was tightly packaged in polyethylene bags and frozen until needed for use. The other portion was air dried at room temperature in a constant 65% humidity room to a moisture of about 12%. When ready for use the wood was severed into two end pieces, each about 400 mm long, with a 25 mm long piece being taken out of the center portion for moisture and specific gravity determination. Any samples with critically located knots or cross grain were discarded. The cutting and joining pattern is shown in FIG. 1. Each 400 mm section was then ripped lengthwise to form two pieces about 400 mm long by 38 mm wide by 38 mm thick. Each section was eventually mated with the one from the same 840 mm long piece located diagonally opposite. By taking the diagonally located piece rather than the linearly located piece grain continuity was broken up.

One end of each 400 mm long piece was profiled in a finger joint cutter to form vertical fingers 7 mm long with a base of 2.2 mm. There were four fingers in each 10 mm width of the joint. The pairs cut from the high moisture pieces that had been previously frozen were bagged together and allowed to condition to room temperature for 12–24 hours. Part A of the adhesive mixture was applied to one profiled end and part B to the other profiled end. A spread of about 0.062 g/cm² (0.4 g/in²) was used on each piece. After approximately 10 seconds open time the ends were immediately mated at a pressure of 5520 kPa (800 psi) for a period of four seconds in a Nova-Tech Assembly-Laboratory Finger Joint Tester. The Nova-Tech device is available from Nova-Tech Engineering, Edmonds, Wash. Any squeezed out adhesive was wiped off as cleanly as possible. The resulting glued member was then tested for tensile strength after the predetermined time had elapsed. Tests at 15, 30, 45, 60 and 90 seconds were made without removing the specimen from the Nova-Tech machine. For tests made at longer time intervals the specimens were carefully removed then replaced in the machine at the appropriate time for the tensile test.

Three replicated sets of finger-jointed specimens were prepared. These were dry wood to dry wood sets, dry wood to wet wood sets, and wet wood to wet wood sets. Two groups of specimens were reserved from each set for tests when bond strength was fully developed. These specimens were treated by first storing them in a 65% R.H. conditioning chamber for 24 hours at room temperature. They were then transferred to an oven at 103° C. for 24 hours to simulate kiln drying. Following this they were again conditioned in the 65% R.H. chamber for one week. One group, identified as kiln dried (k.d.), was then tested for tensile strength and wood failure. The other group was subjected to a vacuum pressure test (V.P.) according to the procedure of ASTM 4688 (or AITC 110). In this test samples are first sawed horizontally into slabs 6.4 mm (¼ in) thick so that the entire width of the finger joint is represented. They are submerged under water and subjected to 660 mm (26 in) vacuum for 30 minutes then to 520 kPa (75 psi) pressure for 1½ hours. Samples are removed, surface dried and immediately tested.

Tensile strength and wood failures of the joints for various time periods after pressing are shown in following Tables 1–3. The results given are averages of five replicates. The superscript character following the tensile strength indicates whether values are statistically different. Numbers that do not share a common character are distinct from each other at the 95% confidence level.

TABLE 1

Strength Development for Wet Wood to Wet Wood Bonding

| Time | Moisture Content Range, % | Sp. Gr. Range | Tensile Str., kPa | Wood Failure, % |
|---|---|---|---|---|
| 15 s | 30–113 | 0.36–0.49 | 3160[a] | 0 |
| 30 s | Same | Same | 3550[b] | 0 |
| 45 s | Same | Same | 3830[bc] | 0 |
| 60 s | Same | Same | 4100[c] | 0 |
| 90 s | 30–114 | 0.39–0.63 | 4790[d] | 0 |
| 1 h | Same | Same | 14,180[e] | 0–50 |
| k.d. | Same | Same | 39,300[f] | 95–100 |
| V.P. | Same | Same | 33,240[f] | 85–95 |

TABLE 2

Strength Development for Wet Wood to Dry Wood Bonding

| Time | Moisture Content Range, % | Sp. Gr. Range | Tensile Str., kPa | Wood Failure, % |
|---|---|---|---|---|
| 15 s | 12–15 to 32–138 | 0.40–0.55 | 3280[a] | 0 |
| 30 s | Same | Same | 3760[ab] | 0 |
| 45 s | Same | Same | 4400[b] | 0 |
| 60 s | Same | Same | 4800[b] | 0 |
| 90 s | 12–15 to 25–97 | 0.37–0.57 | 6160[c] | 0 |
| 1 h | Same | Same | 19,240[d] | 1–50 |
| k.d. | Same | Same | 39,590[e] | 70–100 |
| V.P. | Same | Same | 35440[e] | 75–95 |

TABLE 3

Strength Development for Dry Wood to Dry Wood Bonding

| Time | Moisture Content Range, % | Sp. Gr. Range | Tensile Str., kPa | Wood Failure, % |
|---|---|---|---|---|
| 15 s | 12–15 | 0.45–0.56 | 4090[a] | 0 |
| 30 s | Same | Same | 5480[b] | 0 |
| 45 s | Same | Same | 6980[c] | 0 |
| 60 s | Same | Same | 8050[c] | 0 |
| 90 s | Same | Same | 9490[d] | 0 |
| 1 h | Same | Same | 20,620[e] | 50–60 |
| k.d. | Same | Same | 40,980[f] | 85–95 |
| V.P. | Same | Same | 34,470[f] | 90–95 |

Figure 2:
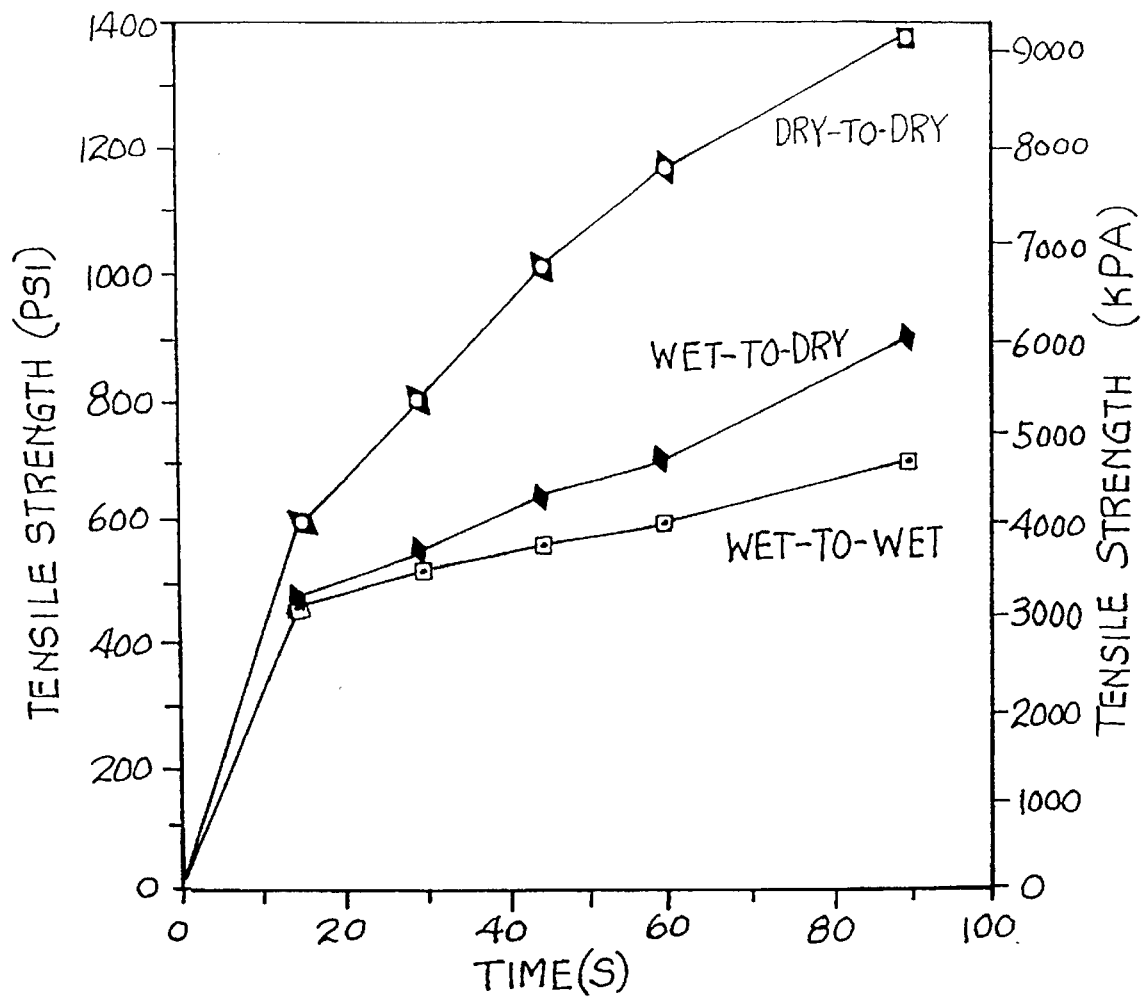
FIG. 2 is a graph showing tensile strength development vs. time for finger joints made at various wood moisture conditions.

While dry wood to dry wood joints gave the highest strengths, wet-to-wet and wet-to-dry joints also produced excellent results which showed good strengths and significant wood failure only one hour after assembly. A comparison of tensile strengths vs. times up to 90 seconds is shown graphically for all three conditions in FIG. 2.

EXAMPLE 2

In order to evaluate the effect of finger joint mating pressure, undried (wet) Douglas-fir wood samples were prepared as in the previous example for finger jointing. Mating pressures were 5520 kPa (800 psi), as was used before, and 3450 kPa (500 psi). Adhesive composition and spreads were as in Example 1 except that one group of control samples was mated without adhesive. The moisture contents varied over the range of 29–64% and specific gravity over the range of 0.40–0.67. Tensile strength was measured 15 seconds after mating and after the vacuum-pressure test. Results are given in Table 4.

TABLE 4

Mating Pressure vs. Joint Strength -- Wet Wood

| Time | Mating Pressure, kPa | Adhesive | Tensile Strength, kPa | Wood Failure, % |
|---|---|---|---|---|
| 15 s | 5520 | No | 1980[a] | 0 |
| 15 s | 3450 | No | 1210[b] | 0 |
| 15 s | 5520 | Yes | 3300[c] | 0 |
| 15 s | 3450 | Yes | 1810[a] | 0 |
| V.P. | 5520 | Yes | 33,480[d] | 85–95 |
| V.P. | 3450 | Yes | 32,720[d] | 80–90 |

Glued samples made with the lower mating pressure did not develop better early strength at 15 seconds than those with no adhesive mated at the higher pressure. However, ultimate strength did not appear to be dependent on mating pressure.

EXAMPLE 3

In an experiment similar to that of Example 2 in which dry Douglas-fir was finger jointed, a new set of samples was made to determine the effect of closed assembly time prior to full compression of the joints. The adhesive coated pieces were assembled by hand and allowed to set for either 1 or 2 minutes prior to application of pressure. Moisture content of the pieces was in the 12–15% range and specific gravity in the range of 0.45–0.56.

TABLE 5

Effect of Closed Assembly Times on Joint Tensile Strength

| Time | Assembly Time, min | Tensile Strength, kPa | Wood Failure, % |
|---|---|---|---|
| 15 s | 1 | 4650[a] | 0 |
| 15 s | 2 | 4450[a] | 0 |
| V.P. | 1 | 36,180[b] | 85–95 |
| V.P. | 2 | 34,900[b] | 80–95 |

It is evident that within the range of closed assembly time investigated there was no significant difference on tensile strength of the joint. Referring back to Table 3, it is evident that the above prolonged assembly times gave joint tensile strengths at least equivalent to those in which assembly time was only about 10 seconds.

EXAMPLE 4

The four species collectively referred to as the southern yellow pines are an extremely important source of construction lumber and panel products. They tend to run to higher moisture contents than Douglas-fir when green and are, in general, more difficult to glue. Using the same general glue formula employed for Douglas-fir in the previous examples, green southern pine wood at various moisture contents was finger jointed as described above using about 10 second assembly time before application of pressure to the joint. Part B of the formulation was made using both 6 and 10 parts of morpholine per 100 parts of resin. Tensile strength results for short time intervals after release of pressure are given in Table 6.

TABLE 6

Strength Development for Wet Southern Yellow Pine Finger Joints

| Moisture Content, % | Morpholine Parts by Wt.* | 15 seconds | Tensile Str., kPa 30 seconds | 60 seconds |
|---|---|---|---|---|
| 88 | 6 | 3650 | — | — |
| 104 | 6 | — | — | 5650 |
| 122 | 6 | — | — | 5210 |
| 155 | 6 | — | — | 5160 |
| 46 | 10 | 3320 | — | 4890 |
| 109 | 10 | — | — | 4160 |
| 143 | 10 | 3370 | 3900 | 3610 |
| 179 | 10 | — | 3830 | 4360 |

*Per 100 parts resin

Samples in the above moisture range submitted to the vacuum-pressure test under the conditions described earlier developed ultimate joint strengths in the range of 20,130 kPa to 29,290 kPa. Wood moisture content and the amount of morpholine in Part B of the resin system did not appear to have a significant effect on strength results. It is readily apparent that excellent finger joint tensile strengths are obtainable over a very wide range of wood moisture contents including those at extremely high moisture levels.

EXAMPLE 5

In the preceding examples all of the samples tested for ultimate strength had been subjected to a simulated kiln dry sequence by placing in an oven at 103° C. for 24 hours followed by seven days conditioning at room temperature and 65°% R.H. In order to ascertain that this heating sequence was not responsible for a major contribution to ultimate strength development a large set of samples was made during an actual mill trial. The simulated kiln drying sequence was omitted for all except one group of samples and it was modified for that group. The wood species used in the trial were mixed western softwoods, predominately Douglas-fir. Strength tests were run in excess of two weeks after sample preparation. Samples were made using three moisture content groupings: dry wood to dry wood, wet wood to wet wood, and wet wood to dry wood. Moisture content of the wet samples was believed to be in the 30–65% range while the dry samples averaged about 12% and under. A fourth set of samples was prepared for comparison in which dry-to-dry joints were then subjected to a 16 hour oven cycle at 71° C. and then reconditioned for 7 days at 50% R.H. During the run a line slowdown caused one set of dry-to-dry joints to have a closed assembly time after low pressure joining of six minutes or greater. The adhesive composition and spread rate of all samples was the same as that described for Example 1. Results of tensile tests are given in Table 7.

TABLE 7

Development of Ultimate Strength without Using Simulated Kiln Drying Cycle

| | Tensile Strength, kPa | Wood Failure, % | Number of Samples |
|---|---|---|---|
| Samples Run As Is | | | |
| Dry to Dry | 31,010 | 87 | 78 |
| Dry to Dry[(1)] | 26,680 | 80 | 43 |

TABLE 7-continued

Development of Ultimate Strength without Using Simulated Kiln Drying Cycle

|  | Tensile Strength, kPa | Wood Failure, % | Number of Samples |
|---|---|---|---|
| Wet to Wet | 26,990 | 74 | 16 |
| Wet to Dry | 31,750 | 87 | 35 |
| Oven Dried[2] | 35,700 | 86 | 36 |
| Samples after Vacuum-Pressure Test | | | |
| Dry to Dry | 29,180 | 86 | 80 |
| Dry to Dry[1] | 26,100 | 85 | 44 |
| Wet to Wet | 23,430 | 77 | 16 |
| Wet to Dry | 29,250 | 86 | 35 |
| Oven Dried[2] | 33,790 | 84 | 36 |

[1]Closed assembly time extended to 6 minutes or longer due to line slow down.
[2]Dry to dry pieces subjected to 16 hours heating at 160° after assembly.

While there was some minor gain in strength after heating it is clearly evident that, regardless of wood moisture content, high levels of joint tensile strength are developed without any heat being applied to the joints. It is also evident that the adhesive system forms excellent bonds independent of wood moisture content.

Phenol-resorcinol-formaldehyde adhesives are used extensively in the manufacture of laminated wood beams and also to a lesser extent for laminated veneer lumber. Laminated veneer lumber (LVL) is formed from glued together veneer sheets in which the grain is parallel in each lamina. This is laid up to appropriate thickness and, after bonding, is then ripped into desirable widths so that the dimensions are most usually the same as solid sawn lumber. LVL has the advantage that there are no defects, such as knots, that extend through the entire thickness. Allowable stress ratings are usually higher than those of any except the top lumber grades. While extensive long term testing has not yet been carried out, it is expected that the adhesives of the present invention will be satisfactory under most operating conditions when used in either of these laminating operations. The following examples show use of the present adhesives for wood laminating.

EXAMPLE 6

Simulated laminated beams were made using Douglas-fir lumber pieces 51×102 mm in cross section and 480 mm long. Prior to laminating the faces were lightly planed. The adhesive was the same composition as that of Example 4, using 4 parts of morpholine in part B. Two layer simulated beams were made up in which 233 g/m$^2$ of part A adhesive was applied by a roller to one face and a similar amount of part B roller applied to the opposite face to be joined together. These were pressed for 15 minutes at 690 kPa and room temperature. A slight amount of glue squeeze-out was noted. After aging for 16 hours at room temperature the samples were submitted for testing. Shear strength of eight replicate samples 51×51 mm cut from the laminates averaged 10,330 kPa (1500 psi). Internal bond tests on a similar number of samples averaged 1990 kPa (290 psi).

EXAMPLE 7

The following example investigates the effect of varying the adhesive spread rate, pressing pressure, press time, and amount of morpholine in part B of the adhesive. In similar fashion to Example 6, simulated laminated beams using western hemlock lumber were made up from pieces 51×102 mm in cross section and 480 mm long. Moisture content of the wood was in the range of 18–22%. One surface of each piece of the lumber was lightly planed prior to application of adhesive. Lamination was at room temperature under the general conditions given in Table 8. After conditioning for 16 hours at ambient conditions, eight 51×51 mm specimens were cut for block shear measurement and a similar number subjected to the pressure soak/redry cycle described in AITC 110 and then subjected to shear tests. Test results are given in Table 9.

TABLE 8

Laminating Process Variables

| Sample No. | Morpholine, g | Spread, g/m$^2$* | Pressure, kPa | Press time, min |
|---|---|---|---|---|
| 1 | 4 | 233 | 97 | 15 |
| 2 | 4 | 233 | 173 | 15 |
| 3 | 4 | 233 | 345 | 15 |
| 4 | 4 | 233 | 690 | 2 |
| 5 | 4 | 233 | 690 | 5 |
| 6 | 4 | 233 | 690 | 10 |
| 7 | 4 | 186 | 690 | 15 |
| 8 | 4 | 155 | 690 | 15 |
| 9 | 4 | 124 | 690 | 15 |
| 10 | 10 | 233 | 690 | 15 |
| 11 | 6 | 233 | 690 | 15 |
| 12 | 2 | 233 | 690 | 15 |

*Spread weight on each member of glue joint. Total spread weight is double that listed.

TABLE 9

Laminating Block Shear Test Results

| Sample No. | Dry Shear, kPa/Wood Failure, % | Soak/Redry Shear, kPa/Wood Failure, % |
|---|---|---|
| 1 | Delaminated out of press | — |
| 2 | 9,660 kPa 77% | 4,010 kPa 94% |
| 3 | 11,630 85% | 10,290 97% |
| 4 | Delaminated out of press | — |
| 5 | 8,380 91% | 7,250 88% |
| 6 | 8,280 81% | 7,030 83% |
| 7 | 8,580 96% | 9,120 97% |
| 8 | 10,540 96% | 8,130 98% |
| 9 | 8,290 98% | 7,530 97 |
| 10 | 9,400 42% | 7,360 72% |
| 11 | 11,610 79% | 11,710 97% |
| 12 | 9,515 99% | 10,230 99% |

It is immediately evident, and not at all surprising, that the low laminating pressure of only 97 kPa (14 psi) did not produce satisfactory laminates in the first series (Samples 1–3). In contrast, it was not expected that laminating pressures of only 173 kPa (25 psi) would produce results as high as the values recorded. In the case of the AITC shear blocks for Sample 2, even though the shear strength was significantly reduced from dry shears, the high wood failure value suggests weak wood rather than a poor glue line.

In the second series (Samples 4–6) two minute press times were clearly inadequate. However, there appeared to be no particular advantage in press times longer than five minutes.

At this point the results from finger jointing with the present adhesives should be recalled. There excellent strengths developed within the first minute. However, finger jointing and wood laminating cannot be directly compared. In many instances excellent finger joint adhesives have totally failed as laminating adhesives. The requirements are sufficiently different that each use should be evaluated separately.

In the third series (Samples 7–9) spread rates were reduced in stepwise fashion from the 233 g/m² previously used on each face of the glue joint. The lower adhesive spread weights gave results quite comparable to those of the higher rates, even when adhesive usage was cut nearly in half.

In the final series (Samples 10–12) reduction of morpholine in Part B of the adhesive to 2 parts per 100 parts resin appeared to give shear results comparable to the 4% used for the balance of the samples. However 10% morpholine seemed to be near the upper limit since wood failure percentages were reduced. This is possibly due to precure caused by a reduced closed assembly tolerance at this very high level of accelerator use.

EXAMPLE 8

A laminated composite billet was prepared using two outer plies of loblolly pine veneer and three inner plies of oriented strandboard. The veneer was about 200×200 mm in surface dimensions and 3 mm thick with a moisture content of about 10%. The strandboard was of similar surface dimensions and moisture content and was about 11 mm thick. The first part of the adhesive was applied by a roll applicator to one face of each veneer sheet and to both faces of the middle strandboard ply at a rate of 242 g/m². The second part of the adhesive was modified by inclusion of 20 parts of morpholine per 100 parts of resin. The outermost plies of strandboard, those adjacent to the veneer, were coated on both sides with the second part of the adhesive, also at a spread rate of 242 g/m². Closed assembly time for the glue lines varied between 5 and 15 minutes while the billet was being prepared. The assembly was then pressed at a pressure of 4830 kPa and a platen temperature of 100° C. The billet was removed from the press and allowed to come to ambient conditions over a several day period of time. It was then cut into sections which were 38×89 mm in cross section and 200 mm in length. While physical strength test results are not yet available no delamination was observed and the assembly appeared to be solidly bonded.

It will be evident to those skilled in the an that many variations could be made in the process and adhesive formulations of the present invention that have not been exemplified or otherwise described. It is the intention of the inventors that these variations should be considered as falling within the scope of the invention if they are encompassed by the following claims.

We claim:

1. A durable rapid curing adhesive composition which comprises:

a first part comprising a resorcinol-formaldehyde or phenol-resorcinol-formaldehyde adhesive resin and a hardener comprising an alkylene group donor in a sufficient amount of to effect an ultimate thermosetting cure of said adhesive resin; and a second part comprising a resorcinol-formaldehyde or phenol-resorcinol-formaldehyde adhesive resin containing a sufficient mount of a modifier to induce rapid curing of the two parts when mixed, said modifier comprising a heterocyclic oxygen and nitrogen containing compound of the formula

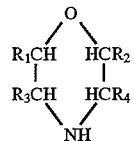

wherein any of $R_1$ to $R_4$ are hydrogen or $C_1$–$C_2$ alkyl, said first and second parts when combined forming an adhesive that will cure rapidly at room temperature.

2. The adhesive of claim 1 in which the alkylene group donor in the first hardener is selected from the group consisting of formaldehyde, paraformaldehyde, α-polyoxymethylene, and mixtures thereof.

3. The adhesive of claim 1 in which the alkylene group donor in the first part is present in an amount sufficient to effect a full thermosetting cure of the adhesive resin in both said first and second parts.

4. The adhesive of claim 1 in which the modifier in the second part is morpholine.

5. The adhesive of claim 4 in which the morpholine is present in an amount of 1–10 parts by weight per 100 parts by weight of second part adhesive resin.

6. A method for making a resin adhesive composition which comprises:

providing a first part comprising a resorcinol-formaldehyde or phenol-resorcinol-formaldehyde adhesive resin and a hardener comprising an alkylene group donor in a sufficient amount of to effect an ultimate thermosetting cure of said adhesive resin;

providing a second part comprising a resorcinol-formaldehyde or phenol-resorcinol-formaldehyde adhesive resin containing a sufficient amount of a modifier to induce rapid curing of the two parts when mixed, said modifier comprising a heterocyclic oxygen and nitrogen containing compound of the formula

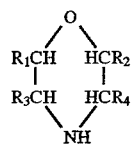

wherein any of $R_1$ to $R_4$ are hydrogen or $C_1$–$C_2$ alkyl, and combining said first and second parts to form a durable adhesive that will cure rapidly at room temperature.

7. The method of claim 6 which comprises selecting the alkylene group donor in the first hardener from the group consisting of formaldehyde, paraformaldehyde, α-polyoxymethylene, and mixtures thereof.

8. The method of claim 6 in which comprises providing an amount of the alkylene group donor in the first part sufficient to effect a full thermosetting cure of the adhesive resin in both said first and second parts.

9. The method of claim 6 in which the modifier in the second part is morpholine.

10. The method of claim 9 in which the morpholine is present in an amount of 1–10 parts by weight per 100 parts by weight of second part adhesive resin.

11. A method of bonding two wood surfaces which comprises:

coating one surface with the first part of a two part resin adhesive system, said first part comprising a resorcinol-formaldehyde or phenol-resorcinol-formaldehyde adhesive resin and a first hardener comprising an alkylene group donor in a sufficient mount to effect an ultimate thermosetting cure of said adhesive resin, coating another surface with the second part of the two part resin adhesive system, said second part comprising a resorcinol-formaldehyde or phenol-resorcinol-formaldehyde adhesive resin containing a sufficient amount of a modifier to induce rapid curing of the two parts when mixed, said modifier comprising a heterocyclic oxygen and nitrogen containing compound of the formula

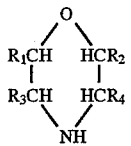

wherein any of $R_1$ to $R_4$ are hydrogen or $C_1$–$C_2$ alkyl; and pressing the adhesive coated surfaces together with sufficient pressure to cause mixing of the two adhesive parts in order to effect a rapid and durable bond.

12. The method of claim 11 which comprises selecting the alkylene group donor in the first hardener from the group consisting of formaldehyde, paraformaldehde, α-polyoxymethylene, and mixtures thereof.

13. The method of claim 11 which comprises providing an amount of the alkylene group donor in the first part sufficient to effect a full thermosetting cure of the adhesive resin in both said first and second parts.

14. The method of claim 11 in which the modifier in the second part is morpholine.

15. The method of claim 14 in which the morpholine is present in an amount of 1–20 parts by weight per 100 parts by weight of second adhesive resin.

16. The method of claim 11 in which the wood surfaces being joined are finger joints.

17. The method of claim 16 in which the finger joints are formed on the ends of round wood.

18. The method of claim 11 in which the wood surfaces being joined are planar surfaces.

19. The method of claim 18 in which the planar wood surfaces being joined are veneer sheets.

20. The method of claim 18 in which the planar wood surfaces being joined are solid sawn wood.

21. The method of claim 18 in which at least one of the wood surfaces is a wood composite material.

* * * * *